(12) United States Patent
Esmailzadeh

(10) Patent No.: US 6,170,514 B1
(45) Date of Patent: Jan. 9, 2001

(54) CITY WATER FLUSHING AND SLUDGE PREVENTION CONTROL APPARATUS

(75) Inventor: Karim Esmailzadeh, 3905 Viola Rd. NE., Rochester, MN (US) 55906

(73) Assignee: Karim Esmailzadeh, Rochester, MN (US)

(*) Notice: Under 35 U.S.C. 154(b), the term of this patent shall be extended for 0 days.

(21) Appl. No.: 09/233,396

(22) Filed: Jan. 19, 1999

(51) Int. Cl.[7] .............................. F16K 21/00; E03B 3/00; B08B 9/027
(52) U.S. Cl. .................. 137/238; 73/863.81; 73/863.86; 134/98.1; 134/99.1; 134/166 C; 134/171; 137/272; 137/544; 137/597; 251/58
(58) Field of Search ................................. 137/238, 240, 137/272, 302, 597, 883, 544; 251/58; 134/98.1, 99.1, 166 C, 171; 73/863.81, 863.86

(56) References Cited

U.S. PATENT DOCUMENTS

| | | | |
|---|---|---|---|
| 659,643 | * 10/1900 | Bonzagni | 137/597 |
| 2,269,382 | * 1/1942 | Schmidt | 251/58 |
| 2,910,266 | * 10/1959 | Condello et al. | 251/58 |
| 3,023,768 | * 3/1962 | Niemi | 137/302 |
| 3,650,506 | * 3/1972 | Bruton | 251/58 |
| 3,737,142 | * 6/1973 | Boswell | 251/58 |
| 3,982,725 | * 9/1976 | Clark | 251/58 |
| 4,087,074 | * 5/1978 | Massey et al. | 251/58 |
| 4,260,128 | * 4/1981 | Tito | 251/58 |
| 4,597,556 | * 7/1986 | Sandling | 251/58 |
| 4,756,479 | * 7/1988 | Lazenby, III | 137/302 |
| 5,201,338 | 4/1993 | McKeague | 137/238 |

* cited by examiner

*Primary Examiner*—George L. Walton
(74) *Attorney, Agent, or Firm*—Rider Bennett Egan & Arundel; Gerald E. Helger

(57) ABSTRACT

For use with a city water system having a plurality of street water mains interconnected by branch water mains and having hydrants connected to the branch water mains, a city water flushing and sludge prevention apparatus consisting of: a sludge-prevention control valve insertable into a branch water main between two street water mains and closer to one of the two street water mains; the sludge-prevention control valve in the closed position preventing water from flowing through the branch water main from the closer street water main during a flushing operation, whereby all water flows through the branch water main from the more distant street water main and thereby flushes the portion of the branch water main between the sludge-prevention control valve and the more distant street water main; and a control mechanism adapted to close and open the sludge-prevention control valve.

20 Claims, 3 Drawing Sheets

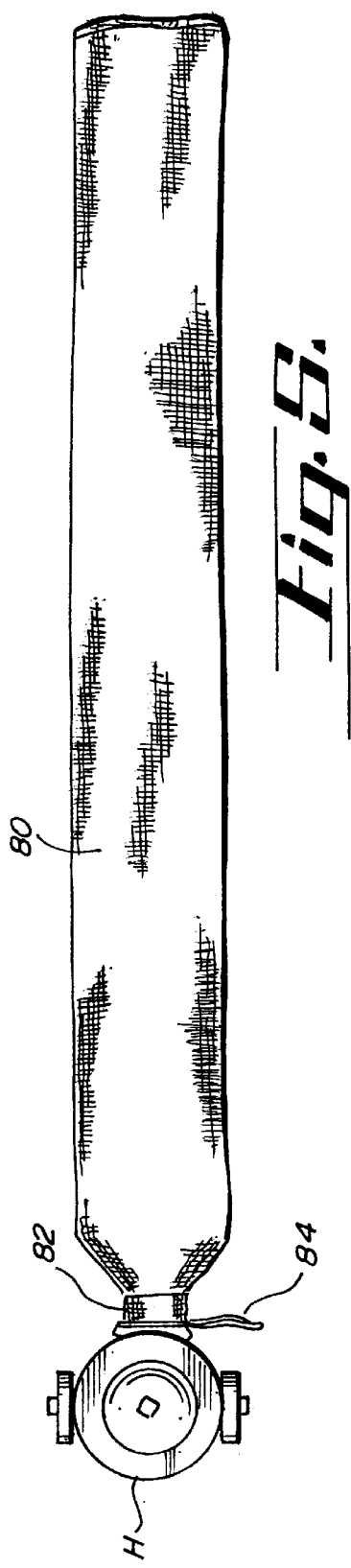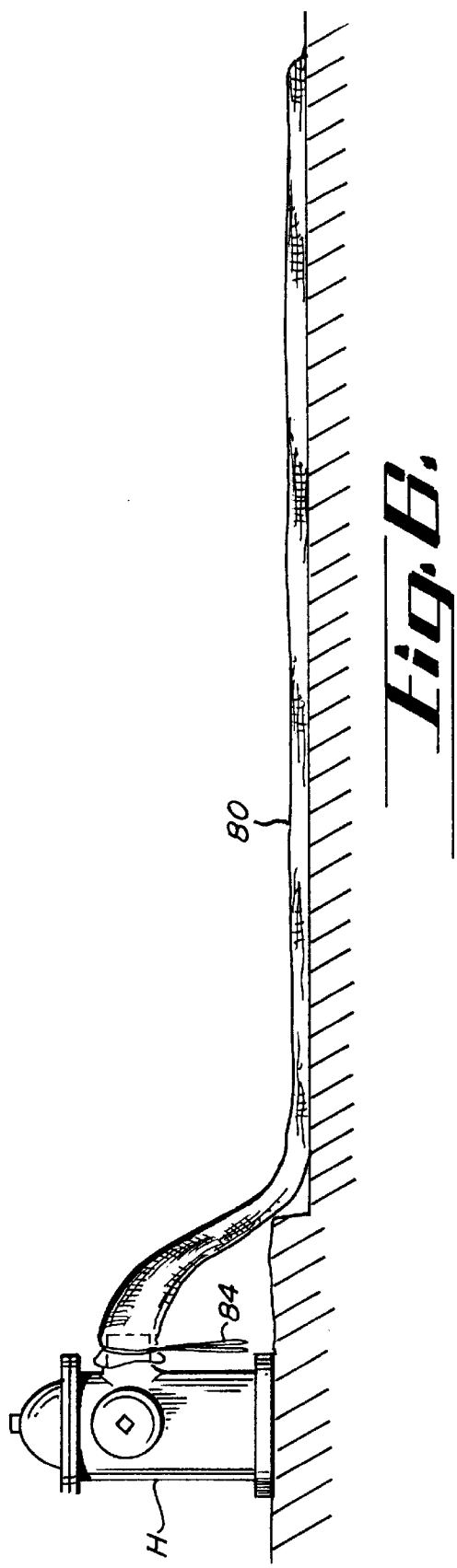

CITY WATER FLUSHING AND SLUDGE PREVENTION CONTROL APPARATUS

BACKGROUND OF THE INVENTION

This invention relates to a city water flushing and sludge prevention control system for use in a city water system having a plurality of street water mains interconnected by branch water mains and having hydrants connected to the branch water mains.

Maintaining and monitoring water quality is becoming increasingly important to most water utilities. In the United States, for example, the Safe Drinking Water Act amendments of 1986 have caused many water utilities to pay very close attention to the quality of water they are providing to their customers. Also, these new regulations require more sampling of the water from points out in the distribution system. These samples are taken on a regular basis and then tested.

U.S. Pat. No. 5,201,338 (herein incorporated by reference) discloses a system and device for flushing water mains and for taking samples from hydrants attached to the water mains. Although the '338 patent can be used to flush water mains using the novel flushing hydrant described therein and to take water samples, there remains a very serious problem in flushing water mains using the flushing hydrant of the '338 patent, other flushing hydrants, or fire hydrants.

The problem is best described by reference to FIG. 1, which shows the usual layout of a city water system.

In a city water system, street water mains M generally run down city streets and have a number of branch water mains B which interconnect the street water mains M. In turn, buildings are connected to the branch water mains B. The branch water mains B also have fire hydrants H attached at various points.

It is known that sludge may accumulate in the branch water mains B unless they are periodically flushed. Flushing is typically done by opening hydrant $H_1$ attached to a branch water main B. However, because of the path of least resistance, water will generally only flow from the street water main $M_1$ closest to the branch water main B with the open hydrant $H_1$, and not from the street water main $M_2$ more distant from the branch water main B with the open hydrant $H_1$. Therefore, the segment $B_1$ of the branch water main B between street water main $M_1$ and the hydrant H will be flushed, but the segment $B_2$ between hydrant $H_1$ and street water main $M_2$ will not be flushed. Also, the attachment pipes between buildings and segment $B_2$ will not be flushed.

Applicant has found that the buildup of sludge in the unflushed segments of the branch water mains B and the attached buildings can cause damage to copper pipes in the buildings if the sludge contains erosive materials.

There is a need for a sludge prevention control system that allows the segments $B_2$ between the flushing hydrant $H_1$ and the more distant street water main $M_2$ to be completely flushed. There is also a need for a sampling apparatus that allows sludge to be detected and analyzed for erosive materials while the mains are being flushed.

SUMMARY OF THE INVENTION

For use with a city water system having a plurality of street water mains interconnected by branch water mains and having hydrants connected to the branch water mains, a city water flushing and sludge prevention apparatus consisting of: a sludge-prevention control valve insertable into a branch water main between two street water mains and closer to one of the two street water mains; the sludge-prevention control valve in the closed position preventing water from flowing through the branch water main portion from the closer street water main during a flushing, operation, whereby all water flows through the branch water main portion from the more distant street water main and thereby flushes the portion of the branch water main between the sludge-prevention control valve and the more distant street water main; and a control mechanism adapted to close and open the sludge-prevention control valve.

A principal object and advantage of the present invention is that it permits a segment of a branch water main that is not flushed by standard flushing operations to be flushed.

Another principal object and advantage of the present invention is that it thereby allows sludge to be removed from the normally unflushed segment and buildings attached to this segment.

Another principal object and advantage of the present invention is that this sludge removal helps to prevent damage to copper pipes caused by erosive materials in the sludge.

Another object and advantage of the present invention is that it may include a remote actuator attached to a fire hydrant which operates a sludge prevention control valve when the fire hydrant is opened for flushing the branch water mains.

Another object and advantage of the present invention is that it may include a fire department stop valve which prevents activation of the sludge prevention control valve by the remote actuator when high water pressure is desired, so that water to the hydrant comes from the street water main closest to the hydrant.

These and other objects of the present invention will become readily apparent upon further review of the following specification and drawings.

BRIEF DESCRIPTION OF THE DRAWINGS

FIG. 5 is a top plan view of a sludge filter bag of the present invention connected to a hydrant.

FIG. 6 is a side elevational view of a Sludge filter bag of the present invention connected to a hydrant.

Similar reference characters denote corresponding features consistently throughout the attached drawings.

DETAILED DESCRIPTION OF THE PREFERRED EMBODIMENTS

Figure 1:
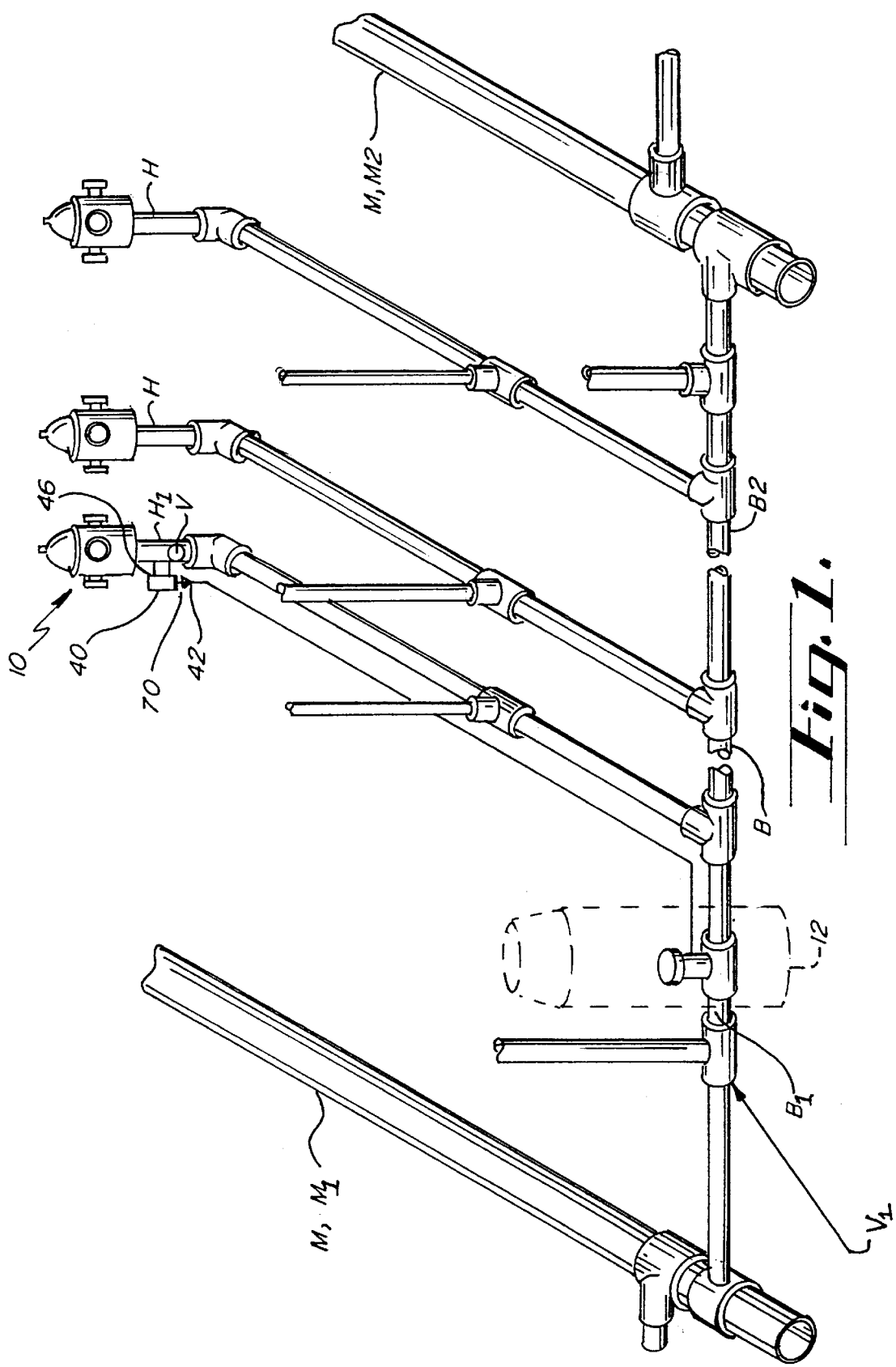
FIG. 1 is a schematic of the city water flushing and sludge prevention apparatus in place in a city water system.

The city water flushing and sludge prevention control system of the present invention is generally shown in the Figures as reference numeral 10.

Referring, to FIG. 1, the city water flushing and sludge prevention control system 10 further comprises a sludge-prevention control valve 12 insertable into a branch water main B between two street water mains $M_1$, $M_2$ and closer to street water main $M_1$.

When the sludge-prevention control valve 12 is in the closed position, it will prevent water from flowing through the branch water main B from street water main $M_1$ during a flushing operation, so that all water flows through the branch water main B from street water main $M_2$, the more distant street water main, and thereby flushes the portion $B_2$ of the branch water main B between the sludge-prevention control valve 12 and the more distant street water main $M_2$.

A control mechanism 14 is adapted to close and open the sludge-prevention control valve 12.

Figure 2:
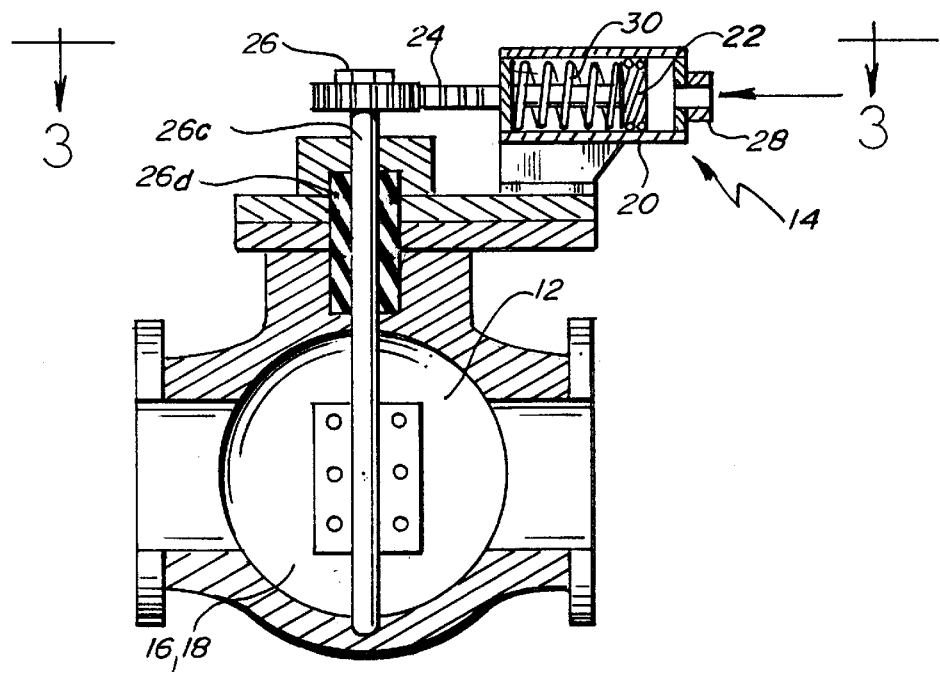
FIG. 2 is a cross-section of the sludge prevention control valve of the present invention and a control mechanism for closing and opening the sludge prevention control valve.

FIG. 2 shows the details of a preferred embodiment of the sludge-prevention control valve 12. As can be seen, the sludge-prevention control valve 12 comprises a valve closure 16 and this valve closure 16 is preferably a butterfly valve 18. Alternatively, any standard type of valve closure such as a poppet could be used.

FIG. 2 shows the butterfly valve 18 in the open position in which the butterfly valve 18 is parallel to the direction of water flow. As is well known, the butterfly valve 18 is closed by moving it so that it is perpendicular to the direction of water flow. Other standard valve parts such as seats and gaskets arc not shown.

Figure 3:
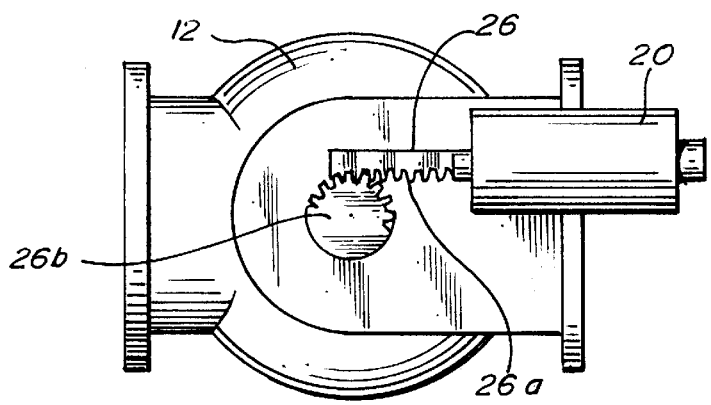
FIG. 3 is a top plan view of the sludge prevention control valve of the present invention.

FIG. 2 also shows details of a preferred embodiment of the control mechanism 14. As can be seen, the control mechanism 14 preferably comprises a valve hydraulic cylinder 20, a valve hydraulic cylinder piston 22 reciprocating in said valve hydraulic cylinder 20, and a linkage 24 between said valve hydraulic cylinder piston 22 and said valve closure 16. The linkage 24 may preferably be a rack and pinion 26, of which more detail is shown in FIG. 3.

The control mechanism 14 is activated to close the valve closure 16 by applying hydraulic fluid pressure to the valve hydraulic cylinder 20 at input port 28. Such hydraulic fluid pressure will cause the valve hydraulic cylinder piston 22 to move the linkage 24 in such a manner as to close the valve closure 16. In the preferred embodiment shown, the piston 22 causes the rack 26a to rotate the pinion 26b, as seen in FIG. 3. The pinion 26b is in turn connected to valve closure 16 by any suitable means such as a rod 26c rotating in a bushing 26d. Such rotation causes the valve closure 16 to rotate into a closed position.

When hydraulic fluid pressure is removed from the input port 28, the spring return 30 will force the piston 22 towards its rest position, thereby causing the rack and pinion 26 to rotate the valve closure 16 to the open position. Water pressure in the branch water main B will assist in opening the valve closure 16.

The city water flushing and sludge prevention control system 10 also preferably comprises a remote actuator 40 connected to the control mechanism 14, to cause remote operation of the control mechanism 14 and thus the sludge-prevention control valve 12.

The remote actuator 40 can be any apparatus that applies hydraulic fluid pressure to the control mechanism 14 through a hydraulic line 42. Preferably, however, the remote actuator 40 is activated by water pressure from a hydrant $H_1$ when the hydrant $H_1$ is opened to flush the branch street water main B. In this manner, flushing and activation of the sludge-prevention control valve 12 can be accomplished in a single step.

Figure 4:
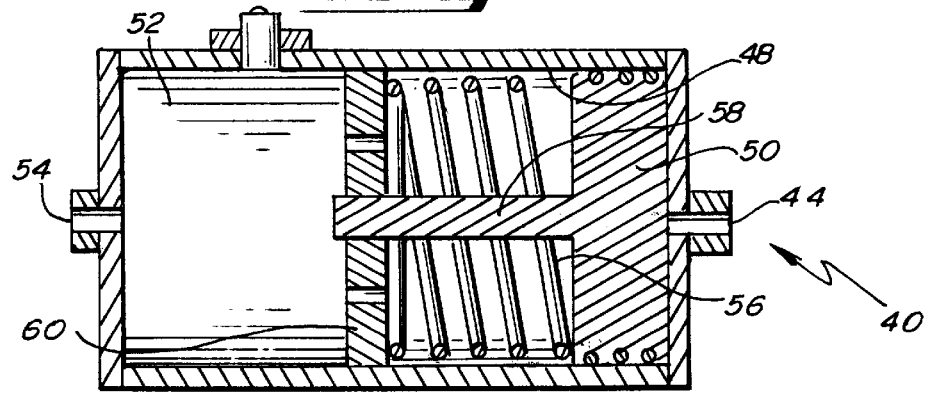
FIG. 4 is a cross-section of a remote actuator for activating the control mechanism.

As seen in FIGS. 1 and 4, to implement this preferred embodiment, the remote actuator 40 preferably comprises an input water pressure port 44 connected to the hydrant H through connecting pipe 46 (FIG. 1). It will be seen that water pressure from the hydrant H will be exerted against input water pressure port 44 when the hydrant H is opened for flushing. Standard construction of a hydrant H includes hydrant valve V which is typically below the frost line, so that no water pressure will be exerted against input water pressure port 44 when the hydrant valve V is closed.

An actuator cylinder 48 and actuator piston 50 are connected to the input water pressure port 44 as shown in FIG. 4. When water pressure from the hydrant H is exerted against actuator piston 50, the actuator piston 50 in turn asserts pressure against the hydraulic fluid 52 within the actuator cylinder 48. This hydraulic fluid in turn is connected to fluid in the hydraulic line 42 at hydraulic output port 54, which is in turn connected to the control mechanism 14 as described above. Hydraulic pressure is thus transferred to the control mechanism, causing the valve closure 16 to close.

The actuator 40 also preferably includes a spring return 56 which forces the actuator piston 50 back to its rest position when water pressure is removed from the input port water pressure port 44 when the hydrant valve V is closed. In turn, hydraulic pressure will be removed from the hydraulic line 42, allowing the control mechanism 14 to open the sludge-prevention control valve 12. The actuator 40 may also include a piston rod 58 and piston rod guide plate 60, as shown.

A fire department stop valve 70 may be included to prevent activation of the sludge-prevention control valve when the hydrant $H_1$ is opened. This may be important to provide maximum water pressure at the hydrant $H_1$, from the street water main $M_1$ closest to the hydrant $H_1$. The fire department stop valve 70 may be inserted in the hydraulic line 42.

The city water flushing and sludge prevention control system 10 may also include a sludge filter bag 80 which is attachable to the hydrant H as shown in FIGS. 5 and 6, for collecting sludge for testing. The filter bag 80 can be constructed or fabric or other materials with openings in the range of 5 microns to 200 microns. The filter bag 80 is generally a minimum of 20 feet long with a diameter of about 3 feet, thus providing a filter area of 60 square feet. However, any other size could be used to provide greater filter surface area. The filter bag 80 has a throat 82 of size appropriate to attachment to the hydrant H. Standard size is 12 inches. The filter bag 80 can be connected to the hydrant H by any suitable means, one being a tie rope 84.

To test for the presence of erosive materials in the branch street water main B, the filter bag 80 is attached to the hydrant H and the sludge-prevention control valve 12 is closed to cause water to flow through the portion $B_2$ of the branch street water main B. The hydrant valve V (not shown) in hydrant H is then opened very slowly to 100%, and water is permitted to run out of the hydrant H into the filter bag 80 for 10 minutes or more. If the water comes out dirty, the water is permitted to run until clear water starts to appear.

This can also be done for initial testing of city water without having the sludge-prevention control valve by simply closing the main shut off valve $V_1$.

The filter bag 80 is then dried by any suitable means, such as rolling it up and putting it in a clothes dryer. The sludge is then vacuumed off the bag 80 and weighed and tested for erosive materials. One way of testing for erosive materials is to drop some super glue on a piece of fabric and then drop some sludge on the glue and let it dry. The fabric is then run over a copper pipe, and if scratches appear in the surface of the pipe, the sludge has erosive materials which could damage the copper pipes in buildings.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. For use with a city water system having a plurality of street water mains interconnected by branch water mains and having hydrants connected to the branch water mains, a city water flushing and sludge prevention apparatus comprising:
    (a) a sludge-prevention control valve insertable into a branch water main between two street water mains and closer to one of the two street water mains;
    (b) said sludge-prevention control valve in the closed position preventing water from flowing through the branch water main from the closer street water main during a flushing operation, whereby all water flows through the branch water main from the more distant street water main and thereby flushes the portion of the branch water main between said sludge-prevention control valve and the more distant street water main, the sludge exiting the branch water main through an open hydrant; and
    (c) a control mechanism adapted to close and open said sludge-prevention control valve.

2. The city water flushing and sludge prevention apparatus of claim 1, further comprising a remote actuator connected to said control mechanism.

3. The city water flushing and sludge prevention apparatus of claim 2, wherein said remote actuator contains hydraulic fluid and said control mechanism is interconnected to said remote actuator by a hydraulic line carrying the hydraulic fluid.

4. The city water flushing and sludge prevention apparatus of claim 3, wherein said remote actuator is activated by water pressure at a hydrant when the hydrant is opened using a hydrant valve to flush the branch street water main.

5. The city water flushing and sludge prevention apparatus of claim 4, wherein said remote actuator further comprises an input water pressure port responsive to water pressure from water flowing in the open hydrant, an actuator piston reciprocating in an actuator cylinder, said actuator piston being in fluid communication with water flowing in the hydrant through said input water pressure port, a piston rod guide plate connected to said actuator piston by a piston rod, a spring return between said piston rod guide plate and said actuator piston, hydraulic oil in said actuator cylinder sealed from said input water pressure port, and a hydraulic output port in fluid communication with said hydraulic oil and said hydraulic line.

6. The city water flushing and sludge prevention apparatus of claim 3, wherein said sludge prevention control valve further comprises a valve closure, and said control system further comprises a valve hydraulic cylinder connected to said hydraulic line, a valve hydraulic cylinder piston reciprocating in said valve hydraulic cylinder, and a linkage between said valve hydraulic cylinder piston and said valve closure.

7. The city water flushing and sludge prevention apparatus of claim 6, wherein said valve closure is a butterfly valve.

8. The city water flushing and sludge prevention apparatus of claim 7, wherein said linkage further comprises a rack and pinion.

9. The city water flushing and sludge prevention apparatus of claim 4, further comprising a fire department stop valve adapted to prevent activation of said remote actuator when the master hydrant is opened.

10. The city water flushing and sludge prevention apparatus of claim 1, further comprising a sludge filter bag attachable to a hydrant for collecting sludge for testing.

11. For use with a city water system having a plurality of street water mains interconnected by branch water mains and having hydrants connected to the branch water mains, a city water flushing and sludge prevention apparatus comprising:
    (a) a sludge-prevention control valve insertable into a branch water main between two street water mains and closer to one of the two street water mains;
    (b) said sludge-prevention control valve in the closed position preventing water from flowing through the branch water main from the closer street water main during a flushing operation, whereby all water flows through the branch water main from the more distant street water main and thereby flushes the portion of the branch water main between said sludge-prevention control valve and the more distant street water main, the sludge exiting the branch water main through an open hydrant;
    (c) a control mechanism adapted to close and open said sludge-prevention control valve; and
    (d) a remote actuator connected to said control mechanism, wherein said remote actuator is activated by water pressure at a hydrant when the hydrant is opened to flush the branch street water main.

12. The city water flushing and sludge prevention apparatus of claim 11, wherein said remote actuator further comprises an input water pressure port responsive to water pressure from water flowing in the open hydrant, an actuator piston reciprocating in an actuator cylinder, said actuator piston being in fluid communication with water flowing in the hydrant through said input water pressure port, a piston rod guide plate connected to said actuator piston by a piston rod, a spring return between said piston rod guide plate and said actuator piston, hydraulic oil in said cylinder sealed from said input water pressure port, and a hydraulic output port in fluid communication with said hydraulic oil and said hydraulic line.

13. The city water flushing and sludge prevention apparatus of claim 12, wherein said sludge prevention control valve further comprises a valve closure, and said control system further comprises a valve hydraulic cylinder connected to said hydraulic line, a valve hydraulic cylinder piston reciprocating in said valve hydraulic cylinder, and a linkage between said valve hydraulic cylinder piston and said valve closure.

14. The city water flushing and sludge prevention apparatus of claim 13, wherein said valve closure is a butterfly valve .

15. The city water flushing and sludge prevention apparatus of claim 14, wherein said linkage further comprises a rack and pinion.

16. The city water flushing and sludge prevention apparatus of claim 11, further comprising a fire department stop valve adapted to prevent activation of said remote actuator when the hydrant is opened.

17. The city water flushing and sludge prevention apparatus of claim 11, further comprising a sludge filter bag attachable to a hydrant for collecting sludge for testing.

18. For use with a city water system having a plurality of street water mains interconnected by branch water mains and having hydrants connected to the branch water mains, a city water flushing and sludge prevention apparatus comprising:

(a) a sludge-prevention control valve insertable into a branch water main between two street water mains and closer to one of the two street water mains;

(b) said sludge-prevention control valve in the closed position preventing water from flowing through the branch water main from the closer street water main during a flushing operation, whereby all water flows through the branch water main from the more distant street water main and thereby flushes the portion of the branch water main between said sludge-prevention control valve and the more distant street water main, the sludge exiting the branch water main through an open hydrant wherein said sludge prevention control valve further comprises a valve closure;

(c) a control mechanism adapted to close and open said sludge-prevention control valve and said control mechanism further comprising a hydraulic cylinder, a piston reciprocating in said hydraulic cylinder, and a linkage between said piston and said valve closure; and (d) a remote actuator containing hydraulic fluid and connected to said control mechanism, wherein said remote actuator is in fluid communication with and is activated by water pressure at a hydrant when the hydrant is opened to flush the branch street water main and further comprising a hydraulic line connecting said remote actuator to said control mechanism.

19. The city water flushing and sludge prevention apparatus of claim 18, further comprising a fire department stop valve adapted to prevent activation of said remote actuator when the master hydrant is opened.

20. The city water flushing and sludge prevention apparatus of claim 18, further comprising a sludge filter bag attachable to a hydrant for collecting sludge for testing.

* * * * *